United States Patent
Bostoen et al.

(10) Patent No.: US 8,407,034 B2
(45) Date of Patent: Mar. 26, 2013

(54) METHOD AND APPARATUS FOR IDENTIFICATION OF AN ACCESS NETWORK BY MEANS OF 1-PORT MEASUREMENTS

(75) Inventors: Tom Bostoen, Brugge St. Andries (BE); Thierry Pollet, Mechelen (BE); Patrick Jan Maria Boets, Heffen (BE); Mohamed Zekri, Brussels (BE); Leonard Pierre Van Biesen, Aalst (BE)

(73) Assignee: Alcatel Lucent, Paris (FR)

( * ) Notice: Subject to any disclaimer, the term of this patent is extended or adjusted under 35 U.S.C. 154(b) by 2357 days.

(21) Appl. No.: 10/109,880

(22) Filed: Apr. 1, 2002

(65) Prior Publication Data

US 2002/0186760 A1  Dec. 12, 2002

(30) Foreign Application Priority Data

Apr. 2, 2001 (EP) .................... 01400832

(51) Int. Cl.
*G06F 17/50* (2006.01)
(52) U.S. Cl. .......................... 703/13; 375/22
(58) Field of Classification Search .............. 375/22
See application file for complete search history.

(56) References Cited

U.S. PATENT DOCUMENTS

| | | | |
|---|---|---|---|
| 5,751,766 A | 5/1998 | Kletsky et al. | |
| 2001/0043647 A1* | 11/2001 | Belge | 375/222 |
| 2002/0067802 A1* | 6/2002 | Smith et al. | 379/1.04 |
| 2002/0122552 A1* | 9/2002 | Liu | 379/399.01 |

FOREIGN PATENT DOCUMENTS

WO  WO 01/01158 A1  1/2001

OTHER PUBLICATIONS

P. Boets "Frequency Domain Identification of Transmission Lines from Time Domain Measurements", Ph-D Thesis, Vrije Universiteit Brussel. Dept. ELEC, Plenlaan 2, 1050 Burssels, Jun. 1997, pp. 1-111.
T. Starr et al.: "Understanding Digital Subscriber Line Technology", D. M. Pozar Microwave Engineering, $2^{nd}$ ed., New York: John Wiley & Sons, 1998, pp. 1-63, 66-97, 100-131, 355-361.
Transmission Line Theory, Chapter 2, pp. 56-103.
Microwave Network Analysis, Chapter 4, pp. 182-250.
Impedance Matching and Tuning, Chapter 5, p. 251.
Patrick Boets et al, "On the Identification of Cables for Metallic Acces Networks", Proc. IMTC 2001.

* cited by examiner

*Primary Examiner* — Saif Alhija
(74) *Attorney, Agent, or Firm* — Sughrue Mion, PLLC

(57) ABSTRACT

Method and apparatus for modeling a network are described in which a 1 port measurement is made on the network by inputting an excitation signal at one port of the network and recording the results reflected back to the port. A 1 port parametric model of the network is generated whereby as much information about the topology of the network is included in calculating initial values of the parameters. Then the values of the parameters of the 1 port parametric model are optimized by reducing the difference between the results of the measurement step and results calculated using the 1-port parametric model and the excitation signal.

11 Claims, 7 Drawing Sheets

METHOD AND APPARATUS FOR IDENTIFICATION OF AN ACCESS NETWORK BY MEANS OF 1-PORT MEASUREMENTS

The present invention relates to simulation methods for telecommunications networks and to telecommunications networks themselves having a receiver and a transmitter connected by some form of communications channel. The present invention is especially useful for the prediction of network parameters such as a capacity of the network, and in particular xDSL networks.

TECHNICAL BACKGROUND

The acronym xDSL stands for the family of Digital Subscriber Line technologies, which allow high-speed access to the Internet and multimedia services over the local loop, which connects the CP (customer premises) to the CO (central office), that is over simple twisted pair cables. An xDSL transceiver at the CO communicates with an xDSL transceiver at the CP over the local loop.

Since decades the local loop, which is a transmission line consisting of two twisted copper wires, also called unshielded twisted pair (UTP), has given the customer access to POTS (Plain Old Telephony Service). The POTS signal, transmitted over the local loop, is analog and contained in the frequency band up to 4 kHz, which corresponds to the spectral content of speech.

xDSL exploits the frequency band above 4 kHz up to several MHz, which is not used by POTS. However as the legacy local loops have been engineered for voice-band transmission, there are no guarantees about the quality of the local loop with respect to transmission in this higher frequency band. Consequently it is preferable if every loop is qualified for xDSL.

The quality of a loop is expressed by its theoretical channel capacity, which is equivalent to the upper bound of the achievable bit rate. The capacity depends on the signal-to-noise ratio (SNR) as a function of the frequency at the receiver at the CP, respectively the CO, for the downstream transmission (from the CO to the CP), respectively the upstream transmission (from the CP to the CO). The SNR at the receiver at the CP, respectively the CO, is determined as a function of the frequency by the transfer function of the loop between the CO and the CP and the noise PSD (Power Spectral Density) at the CP, respectively the CO given the PSD of the transmitted signal at the CO, respectively the CP.

$$C = \int_0^W \log_2\left(1 + \frac{P(f)}{N(f)}\right) df \quad (1)$$

$$P(f) = |H(f)|^2 S(f) \quad (2)$$

In general the local loop consists of a network of transmission lines. Every line in the network is a UTP characterized by its length and type. The line type specifies the cross-sectional geometrical dimensions, such as the wire diameter (also called wire gauge), and the material physical constants, such as the electrical permittivity of the dielectric separating the 2 copper wires. The most used wire diameters are 0.4 mm, 0.5 mm, and 0.6 mm. Polyethylene (PE) is the most occurring insulator but other materials are also used such as paper and PVC.

The network topology of the local loop is limited to a tree structure. The simplest topology is a single line. The magnitude of the transfer function reflects the attenuation of the line, which gets worse with increasing frequency and line length. Another topology that exists for long loops is a cascade of 2 or more lines with increasing wire diameter from the CO to the CP. For this topology reflections are caused by the change of the wire diameter at the splices connecting 2 lines. A topology that is also frequently encountered, especially in the USA, is a loop with 1, 2 or more bridged taps. A bridged tap is an open-ended line spliced to the main line. Reflections appear for this topology at the splice connecting the bridged tap to the loop and at the open end of the bridged tap. Reflections have a negative impact on the transfer function, because they interfere with the signal propagating along the direct path. For those frequencies for which the interference is destructive, the magnitude of the transfer function reduces. Such reductions rarely appear in the voice band because the bridged taps are usually not too long.

To improve the voice-band transmission for very long loops it has been a common practice to install loading coils, which are inductors of typically 88 mH, inserted in series in the loop. Typically the first loading coil is at 900 m from the CO and subsequent loading coils are spaced 1800 m apart. These loading coils act as low-pass filters with 4 kHz as cut-off frequency, which has such a bad effect on the transfer function above 4 kHz that xDSL cannot operate.

As the twisted pairs constituting the local loop are unshielded, external electromagnetic waves may couple into the loop and propagate towards the CO and the CP causing noise at the receiver. The electromagnetic coupling is reduced by the twisting of the 2 wires, because adjacent segments of the twisted pair experience electromagnetic waves with opposite polarity. In addition the twisting improves the balance of the line. A line is balanced when the 2 conductors have an equal impedance towards the earth. The balancing of the line prevents a common-mode signal from transforming into a differential-mode signal. In the case of a common-mode signal the 2 wires carry equal currents and the return path of the current is the ground. For a differential-mode signal the 2 wires carry opposite currents (out of phase currents). Electromagnetic waves may couple into the line because of imperfect twisting, and the common-mode signal that they cause, may transform into a differential-mode signal because of imperfect balancing, which is correlated with the twisting. Balance decreases with increasing frequency.

The noise is divided into 2 different types according to the origin of the external electromagnetic waves coupling into the loop. The first type of noise is crosstalk, which is the electromagnetic coupling between twisted pairs in the same cable. The cables leaving the CO contain thousands of twisted pairs. The closer to the CP the less pairs there are present in a cable. A difference is made between near-end crosstalk (NEXT) and far-end crosstalk (FEXT). The transmitters at the CO, respectively CP, are the source of NEXT for the near-end receivers at the CO, respectively the CP, and are the source of FEXT for the far-end receivers at the CP, respectively the CO. In general crosstalk gets worse with increasing frequency.

A second type of noise is radio-frequency interference (RFI), which is caused by radio waves coupling into the local loop, that acts as an antenna, especially if there are aerial lines. There are 2 major sources of radio waves in the frequency band of xDSL namely AM radio and amateur radio.

Hence, the local loop has several impairments for transmission in the frequency band of xDSL, which are not present for voice-band transmission. The existing metallic line testing (MLT) systems for POTS are not capable of qualifying the loops for xDSL accurately. Telecom operators need a reliable qualification tool for the deployment of xDSL.

For example, if a customer requests a certain xDSL service, the operator has to be able to estimate the achievable bit rate for the loop that connects the CP of that customer to the CO, especially when a precisely specified quality of service (QoS) in terms of bit rate is to be guaranteed. If the achievable bit rate is underestimated, there is the risk of lost business. If the bit rate is overestimated, the telecom operator risks ending up with a dissatisfied customer and a useless installation as well as troubleshooting costs. As the latter risks are the most important, the telecom operator will subtract a safety margin from the estimated bit rate. In this way the risk of loosing customers and having non-refunded costs is reduced at the expense of increasing the risk of lost business. The more accurate the estimate of the bit rate is, the smaller the safety margin can be, and the less lost business. Hence there is a need for an estimation of the bit rate which should be as accurate as possible, but without incurring large additional costs.

Currently there are systems available on the market for xDSL loop testing, but they require measurements at the CO and at the CP. So a technician has to visit the CP as well as the CO. Furthermore, the interpretation of the measurement results, which requires a lot of expertise, is mainly left to the technician. This makes the loop qualification labour intensive and hence too expensive, in general. Telecom operators are not eager to use this type of qualification scheme on a large scale. The way the loop qualification is actually handled depends on the operator. If there is a database available containing information about the loops in the access network, this knowledge can be used for the loop qualification. If the topology and the lengths and types of the individual line sections of the loops are available, then the transfer functions of the loops can be computed. In order to determine the theoretical channel capacity, the noise PSD at the CO and at the CP is still missing, but the transfer function is already very informative. However not all telecom operators maintain such a database. Furthermore, if the database exists, it often contains a lot of errors, because it is difficult to keep it up-to-date. Without a database a telecom operator has to make do with rules of thumb. For example the distance from the CP to the CO can be used as very rough criterium for loop qualification. The conclusion is that telecom operators need a completely automated xDSL loop qualification system that performs measurements at the CO end of a loop and can interpret the results in order to estimate the achievable bit rate of the loop as accurately as possible. When the loop qualification has been finalized, this system can be used as an xDSL loop testing system for maintenance purposes.

In order to determine the achievable bit rate of a loop, the transfer function of the loop and the noise PSD at the CP, respectively the CO, are needed for the downstream, respectively upstream transmission. These quantities have to be measured from the CO end of the loop. For the noise PSD at the CO this is trivial. The loop transfer function and the noise PSD at the CP cannot be measured directly at the CO.

The quantity that is directly measurable at the CO, which is named port 1, is the scattering parameter S11, which is the ratio of the reflected wave and the incident wave at port 1. The reflected wave is also called a reflectogram and the measurement procedure is named reflectometry, more specifically time-domain reflectometry (TDR) if the waves are measured in the time domain. As the loop is considered as a 1-port, the scattering parameter S11 equals the reflection factor and the loop is completely characterized. However as the loop is designed for transmission between a CO and a CP, it has to be considered as 2-port with the CO as port 1 and the CP as port 2. Then the loop is completely identified by its 4 scattering parameters S11, S21, S12, and S22. The transfer function is related to the S21 scattering parameter. Time-domain reflectometry (TDR) is a well known measurement technique, which has been applied since a few decades in different domains such as cable fault location. Since the beginning of the xDSL deployment TDR has been regarded as a candidate technology to solve the loop qualification problem. There are now xDSL loop testing systems available with an integrated TDR meter, but the interpretation of the measured reflectogram is left to the technician. The loop qualification performed with these systems aims at the detection, location, and removal of local loop impairments such as bridged taps and load coils.

Recently attempts have been made to process the reflectogram in order to estimate the theoretical channel capacity of the loop. This processing is done by means of a artificial neural network (ANN), which transforms a number of inputs into a number of outputs by means of some elementary mathematical operations such as addition or multiplication with scalar, and/or non-linear functions. These operations are structured in a way that resembles a real neural network. The specific structure and the values of the multiplying scalars, called weighting factors, determine the input/output behaviour of the ANN.

Some features of the reflectogram such as the position and height of the peaks, corresponding to the reflected pulses, are used as inputs and some interesting parameters of the loop are used as outputs such as the attenuation of the loop at a number of frequencies.

There are a number of disadvantages related to the use of an ANN network. The ANN has to be trained, i.e. its structure has to be defined and the weighting factors have to be tuned, using a large number of sets of inputs and corresponding outputs. The training procedure has to cover all combinations of loop and noise types present in the network. Extrapolation with respect to the training set is unreliable. For example if the training has been done for loops up to 2 km, then the neural network will give an unpredictable output for a loop of 3 km. Only interpolation is allowed, but validation is necessary. Due to the increasing complexity of the ANN with an increasing number of input and output arguments, the number of inputs and outputs of the ANN has to be limited. This means that not all the information present in the reflectogram is used and this has a negative impact on the accuracy. In addition only a few parameters related to the loop can be predicted. An ANN is a black box model. It doesn't allow inclusion of some priori knowledge about the loop that is available, e.g. the fact that a loop consists of a network of transmission lines. This lowers the accuracy.

SUMMARY OF THE INVENTION

An aspect of the present invention may be described as a method and apparatus for the determination of a model of a 2-port system based on a 1-port measurement and an optimization of a 1-port parametric model using the measurement. The optimized parameters are used in a 2-port parametric model of the system in order to determine useful characteristics of the system such as transmission capacity between the two ports.

The present invention also provides a method and apparatus for determining the expected capacity of a transmission line only using the measurement of the $S_{11}$ scattering parameter for which the transmission line is considered as a 1-port, and the measurement of the noise PSD at one end of the transmission line, e.g. in a CO. Capacity estimation is only one possible application of the present invention.

Another aspect of the present invention is the estimation of the end-to-end transfer function of at least one transmission line based on measurements at one termination location thereof only. It is not possible to derive the transfer function directly from such single-ended measurements. However measurements at one end of the loop allow characterization of the loop completely. The result of the characterization is a model of the transmission line, which can be used to predict the transfer function.

In order to characterize the transmission line an excitation signal is generated at one termination location thereof, e.g. at a central-office end of a local loop, and at the same location the response signal is measured. The excitation signal corresponds to the incident wave and the response signal to the reflected wave. The latter is also called reflectogram. This measurement procedure is called reflectometry (time-domain reflectometry, or TDR, if the signals are measured in the time domain). The ratio of the reflected wave and the incident wave is defined as the scattering parameter $S_{11}$ (also called reflection factor in the case of a 1-port). So the scattering parameter $S_{11}$ of a certain transmission line describes how that line responds in terms of a reflected wave, if it is excited with a certain incident wave. It is remarkable that it is possible to model such a transmission line completely, including its transfer function, only measuring the scattering parameter $S_{11}$. The complete model of the line considered as a 2-port consists of the 4 scattering parameters $S_{11}$, $S_{21}$, $S_{12}$, and $S_{22}$. The transfer function is related to the scattering parameter $S_{21}$.

In one aspect the present invention makes use of a 1-port parametric model of the at least one transmission line in addition to the $S_{11}$ scattering parameter measurement to determine a 2-port parametric model of the at least one transmission line. A transmission loop, e.g. a local loop usually consists of a network of transmission lines connecting the customer premises to the central office. The network topology is limited to a tree structure. Every line in the network is characterized by its length and type. The line type specifies the cross-sectional geometrical dimensions and the material constants.

The present invention may provide a method to model a representation of a network of at least one transmission line, said method comprising the steps of:
  generating and sending over said at least one transmission line an excitation signal from one end of said at least one transmission line; and
  receiving at one end of said at least one transmission line a reflectogram and post-processing said reflectogram to form a frequency domain reflectogram;
wherein said post-processing includes the steps of:
  generating a modeled frequency domain reflectogram using a frequency domain parametric model of said at least one transmission line having adaptable parameters;
  quantifying a difference between said modeled frequency domain reflectogram and said measured frequency domain reflectogram; and
  reducing the difference by adapting parameter values of said modelled frequency domain reflectogram.
The method may also comprise the step of:
  Fourier transforming said measured reflectogram into said measured frequency domain reflectogram;
The present invention may also provide a method to model a representation of at least one transmission line, said method comprising the steps of:
  generating and sending over said at least one transmission line an excitation signal from one end of said at least one transmission line; and
  receiving at one end of said at least one transmission line a time domain reflectogram and post-processing the reflectogram;
wherein said post-processing includes the steps of:
  generating a modeled time domain reflectogram using a frequency domain parametric model of said at least one transmission line having adaptable parameters;
  quantifying a difference between said modeled time domain reflectogram and said measured time domain reflectogram; and
  reducing the difference by adapting parameter values of said frequency domain parametric model.

In the above methods the post-processing step may include estimating a transfer function of said at least one transmission line.

The step of generating a modeled time domain reflectogram in the above methods may include:
  generating the frequency domain parametric model for said at least one transmission line;
  transforming said frequency domain parametric model into the modeled frequency domain reflectogram.

The above methods may include a step of reducing the difference which includes:
  quantifying said difference as a cost function; and
iteratively minimizing said cost function by adapting parameter values of said frequency domain parametric model. The cost function may be a maximum likelihood estimator or a Bayesian estimator.

The output of any of the above methods can be at least one of:
  a set of optimized parameters for the model which minimizes the difference
  a transfer function of the at least one transmission line
  an estimated reflectogram based on the optimized parametric model
  a comparison between an optimized reflectogram and the measured reflectogram
  an estimated capacity for the at least one transmission line
  a yes/no answer or a probability that the at least one transmission line can support a capacity above or below a predetermined target capacity
  a message that the at least one transmission line cannot be modeled within a predetermined accuracy
  a length of the at least one transmission line which can support a predetermined capacity.

In the above methods the at least one transmission line can be a local loop of an access network.

The present invention may also provide a system for modelling a representation of at least one transmission line, comprising:
  means for generating and sending over said at least one transmission line from one end thereof an excitation signal; and
  means for receiving at one end of said at least one transmission line a reflectogram and means for post-processing the reflectogram to a frequency domain reflectogram,
wherein said means for post-processing said reflectogram comprises:
  means for generating a modelled frequency domain reflectogram using a frequency domain parametric model of said at least one transmission line having adaptable parameters;

means for quantifying a difference between said modelled frequency domain reflectogram and said measured frequency domain reflectogram; and means for reducing the difference by adapting parameter values of said modelled frequency domain reflectogram.

The present invention may also provide a system for modelling a representation of at least one transmission line, comprising:

means generating and sending over said at least one transmission line an excitation signal from one end of said at least one transmission line; and receiving at one end of said at least one transmission line a time domain reflectogram and post-processing the reflectogram;

wherein said means for post-processing includes:

means for generating a modelled time domain reflectogram using a frequency domain parametric model of said at least one transmission line having adaptable parameters;

means for quantifying a difference between said modelled time domain reflectogram and said measured time domain reflectogram; and means for reducing the difference by adapting parameter values of said frequency domain parametric model.

The means for generating a modelled frequency domain reflectogram may comprise:

means for generating the frequency domain parametric model for said at least one transmission line;

means for transforming said frequency domain parametric model into a modelled frequency domain reflectogram; and Fourier transforming means for transforming said measured time domain reflectogram into a measured frequency domain reflectogram.

In the above systems the processing means may include means for estimating a transfer function of said at least one transmission line.

In the above systems, the means for reducing the difference may include:

means for quantifying said difference as a cost function; and means for iteratively minimizing said cost function by adapting parameter values of said frequency domain parametric model.

The above systems may include means for outputting at least one of:

a set of optimized parameters for the model which minimizes the difference a transfer function of the at least one transmission line an estimated reflectogram based on the optimized parametric model a comparison between an optimized reflectogram and the measured reflectogram an estimated capacity for the at least one transmission line a yes/no answer or a probability that the at least one transmission line can support a capacity above or below a predetermined target capacity a message that the at least one transmission line cannot be modeled within a predetermined accuracy a length of the at least one transmission line which can support a predetermined capacity.

In the above systems the at least one transmission line may be a local loop of an access-network.

The above systems for modeling may be included in a central office system of a telecommunications network.

The present invention also includes a data carrier medium carrying one or more computer readable code segments for controlling a processing device to carry out any method in accordance with the present invention.

The present invention also includes a computer program product for execution of any of the methods in accordance with the present invention on a computer system.

The present invention also includes a method for modelling a representation of network said method comprising:

transmitting a description of the network from a near location to a remote computing system via a telecommunications network, executing on the remote computer system any of the methods of the present invention, and transmitting to a near location information relating to the response of the network to an excitation signal.

The present invention will now be described with reference to the following drawings.

DESCRIPTION OF THE DETAILS EMBODIMENTS

Figure 1:
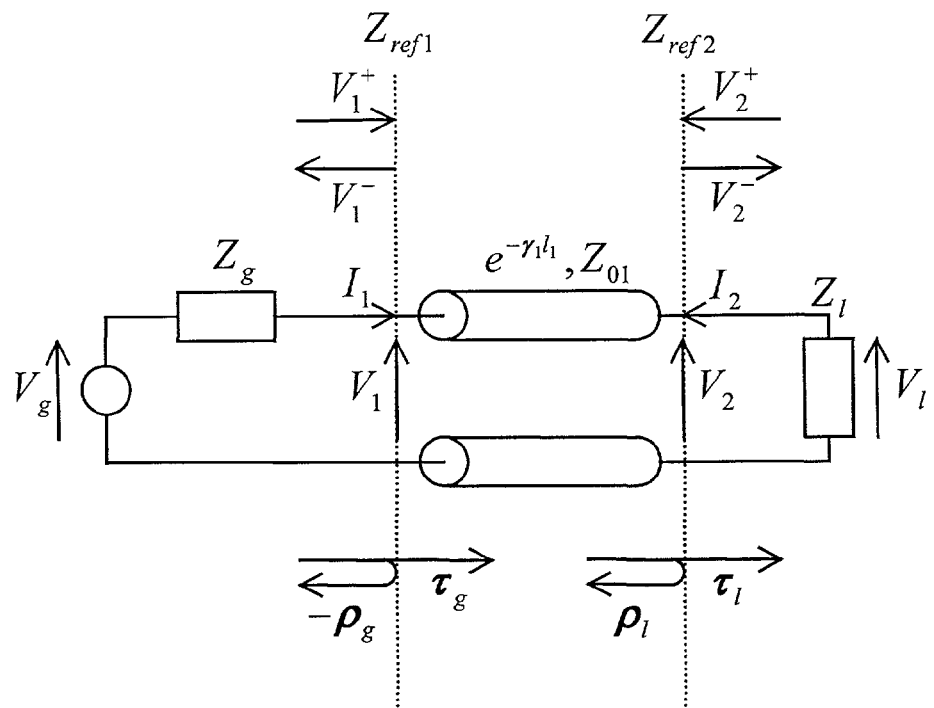
FIG. 1 transmission line model of a single loop.

The present invention will be described with reference to certain embodiments and drawings but the present invention is not limited thereto but only by the claims. In the following embodiments of the present invention will be described by a parametric model detailed for a limited number of network topologies but this does not limit the applicability of the invention. The skilled person will appreciate that the present invention may be extended to other topologies and to other materials once the principles of the present invention have been understood. All such additional topologies are included within the scope of the present invention. Also in the description a twisted pair transmission line model is given. However the invention is not limited to this model and is not limited to twisted pair cables as transmission lines. The application of the present invention is not limited in this respect and it can be used for symmetric or asymmetric lines, for example in the case of coaxial cables, optical fibers, etc. and even in the case of a general 2-port network.

The following references may be found useful for understanding the present invention.

[1] P. Boets, "Frequency Domain Identification of Transmission Lines from Time Domain Measurements", Ph-D. Thesis, Vrije Universiteit Brussel, Dept. ELEC, Pleinlaan 2, 1050 Brussels, June 1997. This document is incorporated by reference in its totality.

[2] P. Boets, M. Zekri, L. Van Biesen, T. Bostoen, and T. Pollet, "On the Identification of Cables for Metallic Access Networks," in Proc. IMTC, 2001, incorporated by reference in its totality.

[3] D. M. Pozar, *Microwave Engineering*, 2nd ed. New York: John Wiley & Sons, 1998. T. Starr, J. M. Cioffi, and P. J. Silverman, *Understanding Digital Subscriber Line Technology*

In accordance with an embodiment of the present invention, given a specified or assumed network topology, a 1-port parametric model for the $S_{11}$ scattering parameter of the network is derived from the models for individual line sections of the network or based on an assumed model. In an $S_{11}$ scattering parameter model the parameters of the individual lines appear as independently identifiable parameters. It is then possible to model the loop completely by only measuring the scattering parameter $S_{11}$. The unknown parameters have to be estimated by a further optimization routine. The optimized parameters are used in a 2-port model of the network for further analysis of the network.

Accordingly, each line in a network is fully characterized by a parametric model, which consists of the characteristic impedance and the transfer function of the line as a function of the frequency and a number of unknown parameters. Several line models are available. A model based on electromagnetic theory is one of the most useful for the line characterization. This model is based on the 4 primary transmission line parameters, which are resistance, inductance, conductance, and capacitance, as a function of the frequency and a number of parameters related to the cross-sectional geometrical dimensions and material constants. These latter parameters are considered to be unknown. In the following, it will be assumed that the transmission line comprises twisted pair cables. For other cable types, equivalent models may be selected. For twisted pair cable, the electromagnetic model assumes that the wire for the local loop comprises 2 cylindrical conductors with the same diameter immersed in a homogeneous dielectric. It allows for the skin effect and the proximity effect (up to 2 terms in the Fourier series solution). It contains 5 independently identifiable parameters, which are related to the cross-sectional geometric dimensions and material constants of the components of the twisted pair cables. The electrical permittivity of the dielectric is considered to be independent of the frequency in this model and the conductance is neglected, which are good approximations for polyethylene (PE). This line model will be called VUB1.

Parameter estimation is an important part of characterization of a loop in accordance with the present invention. In accordance with an embodiment of the present invention the difference between measured values for a loop and the modeled values for the same loop is reduced by appropriate selection/determination of the unknown parameters. For example, a cost function may be introduced which quantifies the deviation between the measured values (reflectogram) and the result of modeling the scattering parameter $S_{11}$ of the loop as a function of the model parameters. In order to match the model as well as possible to the measured values the cost function is minimized as a function of the model parameters. The values of the model parameters corresponding to this minimum are the estimated values of the parameters. The lower limit of the variance of the estimated parameters may given by any suitable method, e.g. by the Cramer-Rao lower bound. The cost function is also called an estimator, because it determines the parameter estimation completely. Several estimators are available. The maximum likelihood estimator (MLE) is preferred because it is consistent, asymptotically unbiased, asymptotically normally distributed, and asymptotically efficient under certain noise assumptions. In addition it is robust. It has such good properties because it takes the noise in the measurement into account. This means of course that this noise has to be measured. The characterization is typically performed in the frequency domain and the measurement in the time domain but the present invention is not limited thereto. Measurements and characterization may be performed in either the time domain or the frequency domain.

The minimum of the cost function as a function of the model parameters is found by means of an optimization algorithm. Typically, this optimization algorithm will be iterative There are several known optimization routines which may be used. The Levenberg-Marquardt (LM) method is preferred. It combines the Gauss-Newton and gradient descent procedures. The Gauss-Newton method is very fast, because it makes use of second-order derivatives, but it does not always converge. This problem of convergence is solved in the Levenberg-Marquardt algorithm by addition of the gradient descent method. The Levenberg-Marquardt algorithm only searches for a local minimum. In order to find the global minimum, the initial values of the model parameters are preferably chosen to be close enough to the exact values, which correspond to the global minimum of the cost function so that the optimization does not become trapped in a local minimum. As the estimated parameters are available for all the individual lines, the loop is completely modeled and the estimated transfer function can be calculated.

In accordance with an embodiment of the present invention, a suitable optimization is based on a $S_{11}$ scattering parameter measurement, an MLE cost function and an LM optimization algorithm. The $S_{11}$ scattering parameter model depends on the network topology and the model for the individual line sections. For every different network topology and line model there is a different $S_{11}$ scattering parameter model. This model has to be calculated. Independently identifiable parameters have to be determined. The derivatives of the model to its parameters have to be computed, because they are needed for the Jacobian in the LM optimization algorithm.

This has been illustrated for 3 different loop topologies: a single line, a cascade of 2 lines, and a loop with 1 derivation, also called bridged tap, but the skilled person will appreciate after having understood the present invention that it may be extended to other topologies. For all these loop topologies the assumption has been made that the loop is open at the customer-premises end, which is a fair approximation of a phone set that is on-hook. For the loop with a bridged tap an additional assumption is that all the individual lines are of the same type. These 3 loop topologies have been chosen to cover all the different causes for reflections in a loop: the mismatch between the generator impedance and the characteristic impedance of the line connected to it, the mismatch between the load impedance and the characteristic impedance of the line connected to it, the mismatch between 2 lines with a different characteristic impedance connected to each other, and the mismatch due to the connection of a derivation.

When the topology of a loop is unknown an alternative method in accordance with an embodiment of the present invention tries each one of a series of well known topologies and makes an optimization of the unknown parameters for each topology by comparison with the reflectogram. The topology which appears to give the best fit with the reflectogram may then taken as the best fit topology for the calculation of the network capacity.

Figure 11:
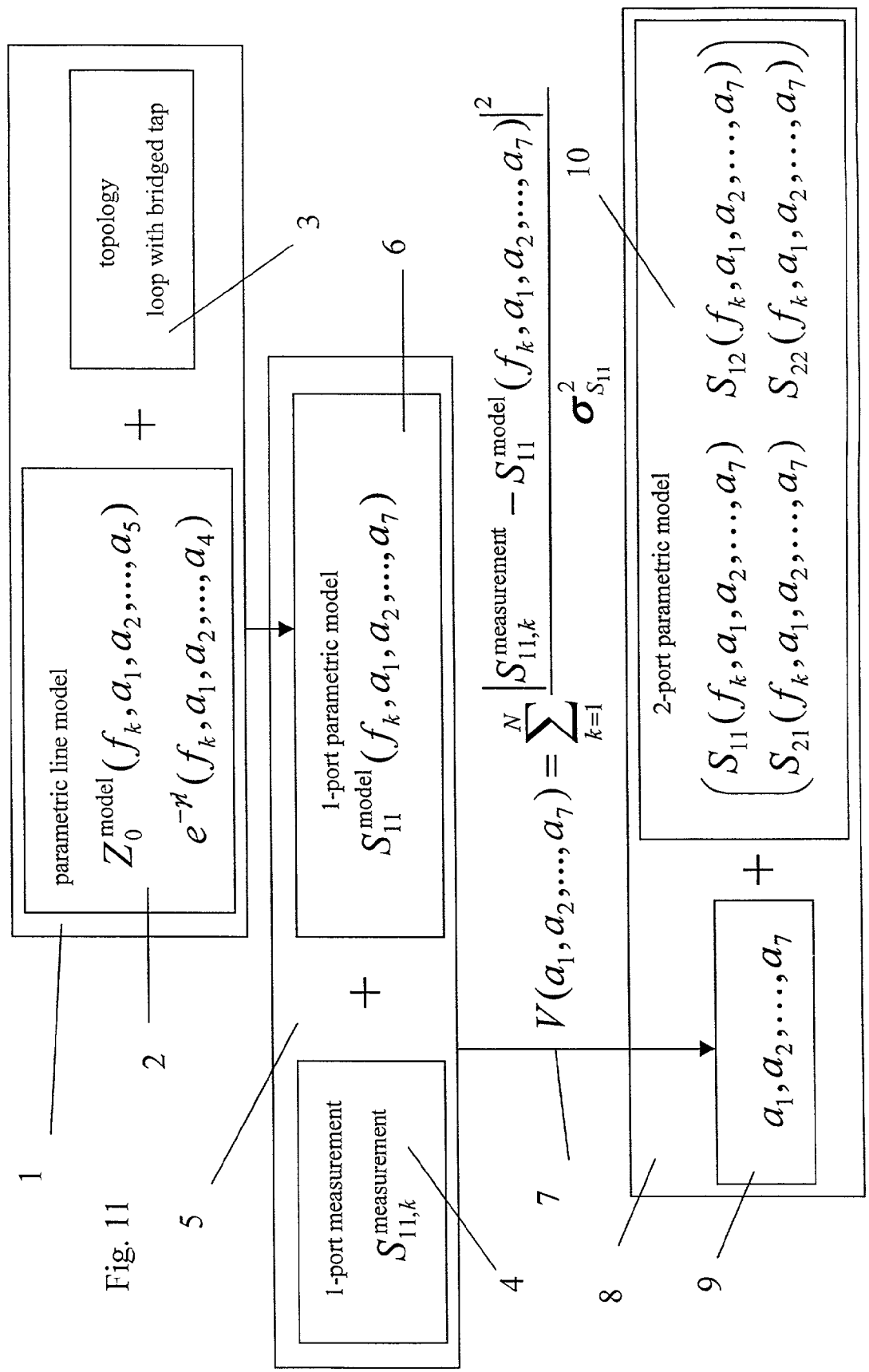
FIG. 11 is a schematic representation of a method flow diagram of an embodiment of the present invention.

A basic methodology in accordance with the present invention will be described with reference to FIG. 11. Firstly a 1-port parametric model 2 having a finite number of coefficients whose values need to be optimised is generated in step 1 for a network based on an actual or assumed topology 3 for the network. Then a 1-port measurement 4 is carried out in step 5 on the network to be analysed. For example, a measurement of the scattering parameter $S_{11}$ may be carried out, but the present invention is not limited thereto—the input impedance Zin could equally well be used. This measurement is used to do the parameter optimisation of the 1-port model 6 of the network in step 7. Then these estimated parameters 9 can be included within a 2-port parametric model 10 for the access network based on a transmission line model for every line segment to compute the estimated transfer function H in step 8. For the purposes of validation only this end-to-end transfer function can be validated with the measured transfer function and the transfer function estimated directly via the transfer function measurement, however, this is only for validation purposes.

The 2-port model of the network can then be used for analysis purposes, e.g. for the calculation of capacity.

The present invention is not limited to access networks of telephone networks, it can be used for any medium used for transmission where there is a transmitter-medium-receiver structure. To identify the medium, 1 port measurements at transmitter or receiver side can be made and these used to optimize a parametric 1-port model for the medium. The parametric model preferably has a limited set of parameters. The parameters of the transmission medium model are optimised and then used to determine a 2-port model for the network. This 2-port model can be used for analysis of transmission characteristics. The transmission medium could be any one suitable for a communications system, e.g. a network of twisted pair lines, coaxial lines, optical fibers, the air interface of a mobile telecommunications network.

I. Models

In accordance with embodiments of the present invention a transmission line or a combination or network of transmission lines is modelled by a parametric model having a finite number of coefficients to be determined, e.g. 5 coefficients $a_1$ to $a_5$ for each "basic transmission line" or transmission line primitive. Such a transmission line primitive can comprise a twisted pair cable such as is used conventionally for the local loop of a public telephone system or, for instance, a twisted pair connection between two network devices on a Local Area Network. To model a network of transmission lines, each transmission line primitive is represented by the above parametric model—that is the network is modeled by a set of individual parametric models, one of each transmission line primitive and each having a finite number of coefficients to be determined. Some of the coefficients (e.g. $a_1$ to $a_5$) may be estimated initially by calculating an initial value based on characteristics of the relevant transmission line, e.g. physical constants of materials used in the connecting cable forming the transmission line. Other coefficients may be selected, e.g. $a_4$, however it is preferred if these coefficients are also determined so as to bring the initial model close to the optimized one. Knowledge of the actual topology of the network or of a finite number of topologies which the network may have can be used to set up the parametric model.

In a further step the reflectogram of the network is measured experimentally from one access point or "port" of the network. To record the reflectogram a suitable test wave or pulse is entered at the relevant port and reflected waves measured at the port. This reflectogram is preferably stored in a manner that allows manipulation of the reflectogram within a digital computing device, e.g. the reflectogram may be converted to digital signals using an analogue to digital converter. In a next step the finite number of coefficients of the parametric model are optimized so as to give a close (or at least a closer fit than the initial values) between a characteristic of the network as modeled and the reflectogram. This comparison may be done in the time domain or the frequency domain. In the following only a comparison in the frequency domain will be described. For example, an optimization routine may be used to optimize the coefficients of the parametric model. The optimization may be done with respect to a cost function. That is, the goodness of fit between the reflectogram and the results predicted by the parametric model (e.g. a difference) may be represented as a quantitative value, and the coefficients may be optimized with reference to this value. For instance, this value may be maximized or minimized depending on whether the chosen value is a large or small value, respectively when there is a good fit.

One problem with such an optimization is that the routine may stop in a local minimum or maximum and not an absolute one. To avoid or reduce the frequency of this problem the present invention makes use of a quasi-realistic model of the network so that there is some correlation between at least certain coefficients of the parametric model and physical constants of the network. By this means at least some of initial values of the parameters should be close to their final optimized ones and therefore there is less chance that the optimization routine lands in a local minimum. This is a significant advantage of the present invention compared with fully heuristic or pragmatic models for which initial values cannot be calculated reliably from network materials and topologies.

Finally, the optimized parameters may be used in a 2-port parametric model of the network to determine characteristics thereof, e.g. a capacity of the network, more specifically a capacity which provides a certain Quality of Service (QoS) such as a threshold signal to noise ratio (SNR), Bit Error Rate (BER), Symbol Error Rate (SER), Frame Error Rate (FER) or similar as is known to the skilled person. A noise power spectral density (PSD) at the ends of the network, e.g. the CP and CO, is required for these calculations (see formula based on the theory of Shannon given as equation 1 above for capacity determination in bits per second). It is generally always possible to measure the noise at one location or port. The noise at the other location or port has to be estimated or a model has to be used.

In the following, a non-limiting number of models of useful topologies for local loops of telephone systems will be described.

A. Transfer Function H and Characteristic Impedance $Z_0$ to an Unshielded Twisted Pair (UTP) Transmission Line The following equations may be used for describing a basic parametric model in accordance with an embodiment of the present invention for an unshielded twisted pair transmission line. This basic parametric model will be used to construct more complex models of networks which can be described by a combination of basic parametric models.

$$\gamma l = \sqrt{z_s y_p l^2} = \sqrt{a_4 s^2 + a_1 s \sqrt{-s} \frac{J_0}{J_1} + \frac{a_1 a_3}{2} s^2 \Psi} \quad (3)$$

which represents the propagation constant of the line times its length.

$$\Psi = \frac{3a_2^3 J_3 J_2 + 2a_2 J_1 J_2 + a_2^2 J_0 J_3}{a_2^3 J_2 J_3 + a_2 J_1 J_2 + 3a_2^2 J_0 J_3 + J_0 J_1} \quad (4)$$

which defines an auxiliary function used in the calculations.

$$J_i = J_i(a_3 \sqrt{-s}) \text{ with } i=0,1,2,3 \text{ (J=Bessel function)} \quad (5)$$

$$H = e^{-\gamma l} \quad (6)$$

which represents the transfer function of a primitive transmission line section $$y_p l = a_5 s \quad (7)$$

where $y_p$ represents the parallel per-unit length admittance of the transmission line $$Z_0 = \frac{\gamma l}{y_p l} \quad (8)$$

where $Z_0$ represents the characteristic impedance of the line

In this model there are five coefficients which need to be optimized with respect to a measured reflectogram. The coefficients to be determined ($a_1$ to $a_5$) may be given initial values in accordance with:

$$a_1 = \frac{1}{a\pi} \sqrt{\frac{\mu}{\sigma} C l^2} \quad (9)$$

$$a_2 = \left(\frac{a}{D}\right)^2 \quad (10)$$

$$a_2 = a\sqrt{\mu\sigma} \quad (11)$$

$$a_4 = \frac{a_1 a_3}{\ln(1/\sqrt{a_2})}$$

The initial value of $a_4$ is preferably chosen as a combination of initial values of $a_1$, $a_2$, and $a_3$ as explained in ref. 1 which is incorporated herewith by reference.

$$a_5 = Cl \quad (12)$$

By introducing parameter $a_4$ no reliance should be placed on the physical meaning of the parameters. However the initial values of the parameters should still preferably have the order of magnitude predicted by the formulas above so that the parametric model optimization is more likely to determine an absolute minimum and not a local minimum.

This transmission line model for twisted pair is based on electromagnetic theory, so it is physical, white-box model (as opposed to black box), that contains as much a priori knowledge as possible. The model includes the skin effect and proximity effect (up to 2 terms of the series solution) and is considered to be suitable for the best mode of operation of the present invention for twisted pair cables. The present invention is not however, limited to this method.

B. Scattering Parameter $S_{11}$, and Transfer Function H of the Access Network

In the following the use of the basic parametric model will be described with reference to a limited number of useful network topologies.

1) Single Line

FIG. 1 depicts an equivalent electrical circuit of an access network consisting of a single line. Initial values of five parameters, $a_1$ $a_2$ $a_3$ $a_4$ $a_5$, of the basic parametric model need to be determined and then optimized. The aim of the modelling exercise is to obtain an expression for $S_{11}$ (1-port model, used for the parameter estimation) and H, the transfer function (2-port model, needed for capacity estimation and validation).

$$\rho_g = \frac{Z_g - Z_{01}}{Z_g + Z_{01}} \quad (13)$$

$$\rho_l = \frac{Z_l - Z_0}{Z_l + Z_0} \quad (14)$$

$$V_i^{\pm} = \frac{V_i \pm Z_{refl} I_i}{2} \text{ with } i = 1, 2 \quad (15)$$

Treating the transmission line as a single port results in:

$Z_l = \infty$, $\rho_l = 1$, (assumption of an open-circuited end of the transmission line, e.g. at the customer premises of a local loop)

$Z_{refl} = Z_g = 100 \, \Omega$

The following equation defines for a 1-port model the scattering parameter $S_{11}$:

$$S_{11} = \left. \frac{V_1^-}{V_1^+} \right|_{V_2^+ = 0} \quad (16)$$

$$S_{11} = \frac{-\rho_g + e^{-2\gamma l}}{1 - \rho_g e^{-2\gamma l}} \quad (17)$$

$$H = \frac{V_2}{V_1} \quad (18)$$

$Z_g = 0$, $\rho_g = -1$, $\tau_g = 2$ $$H = \frac{\tau_l e^{-\gamma l}}{1 + \rho_l e^{-2\gamma l}} \quad (19)$$

The transfer function under consideration starts at the beginning of the line and ends at the load (no generator), the transmit PSD (power spectral density) mask is defined at the location of V1 in FIG. 1, not at the location of Vg.

2) Homogeneous Loop with 1 Bridged Tap

Figure 2:
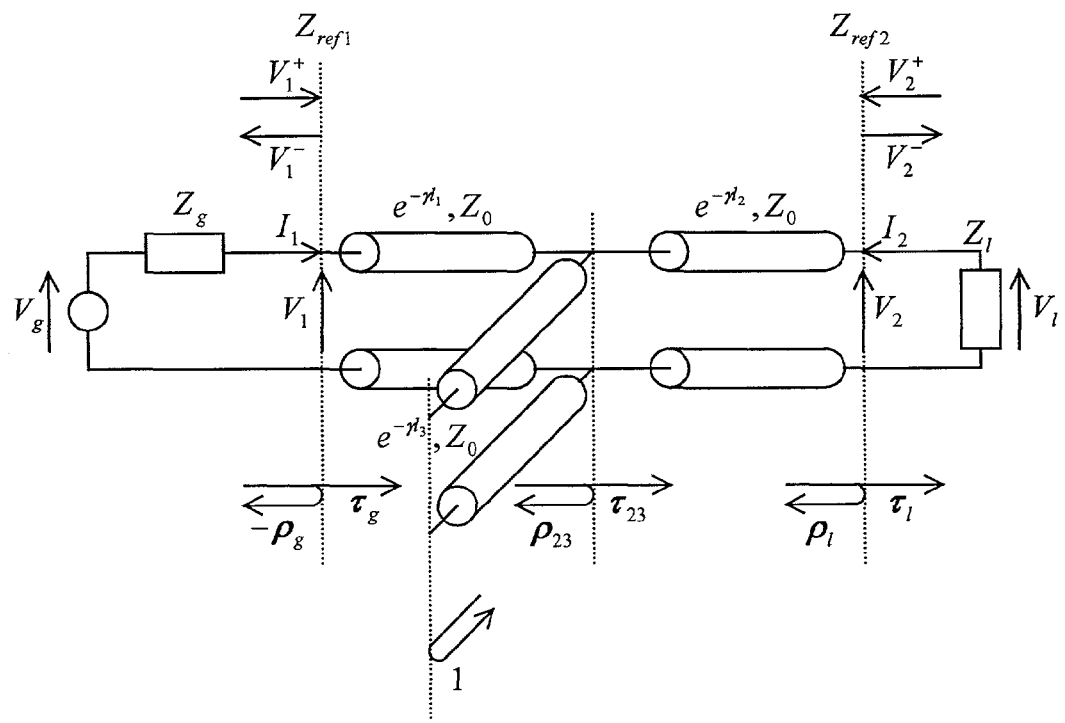
FIG. 2 transmission line model of a bridge tapped loop.

FIG. 2 depicts an equivalent electrical circuit of an access network consisting of a loop with a bridge tap. Initial values of seven parameters, $a_1$ $a_2$ $a_3$ $a_4$ $a_5$ $a_6$ $a_7$ of the parametric model need to be determined and then optimized. The aim of the modeling exercise is to obtain an expression for $S_{11}$, the scattering function and H, the transfer function.

$$a_6 = \frac{l_2}{l_1} \quad (20)$$

$$a_6 = \frac{l_3}{l_1} \quad (21)$$

$Z_f = \infty$, $\rho_f = 1$, (assumption open-circuit at the end)
The following equation defines for a 1-port model the scattering parameter $S_{11}$:

$$S_{11} = \frac{\begin{array}{c}-3\rho_g - e^{-2\gamma l_1} - \rho_g e^{-2\gamma l_2} - \rho_g e^{-2\gamma l_3} + e^{-2\gamma(l_1+l_2)} + \\ e^{-2\gamma(l_1+l_3)} + \rho_g e^{-2\gamma(l_2+l_3)} + 3e^{-2\gamma(l_1+l_2+l_3)}\end{array}}{\begin{array}{c}3 + \rho_g e^{-2\gamma l_1} + e^{-2\gamma l_2} + e^{-2\gamma l_3} - \rho_g e^{-2\gamma(l_1+l_2)} - \\ \rho_g e^{-2\gamma(l_1+l_3)} - e^{-2\gamma(l_2+l_3)} - 3\rho_g e^{-2\gamma(l_1+l_2+l_3)}\end{array}} \quad (22)$$

$Z_g = 0$, $\rho_g = -1$, $\tau_g = 2$ (assumption PSD mask defined at $V_1$)
2-port model: transfer function H $$H = \frac{2\tau_l(e^{-\gamma(l_1+l_2)} + e^{-\gamma(l_1+l_2+2l_3)})}{\begin{array}{c}3 - e^{-2\gamma l_1} + \rho_l e^{-2\gamma l_2} + e^{-2\gamma l_3} + \rho_l e^{-2\gamma(l_1+l_2)} + \\ e^{-2\gamma(l_1+l_3)} - \rho_l e^{-2\gamma(l_2+l_3)} + 3\rho_l e^{-2\gamma(l_1+l_2+2l_3)}\end{array}} \quad (23)$$

3. Cascade of 2 Line Sections

Figure 3:
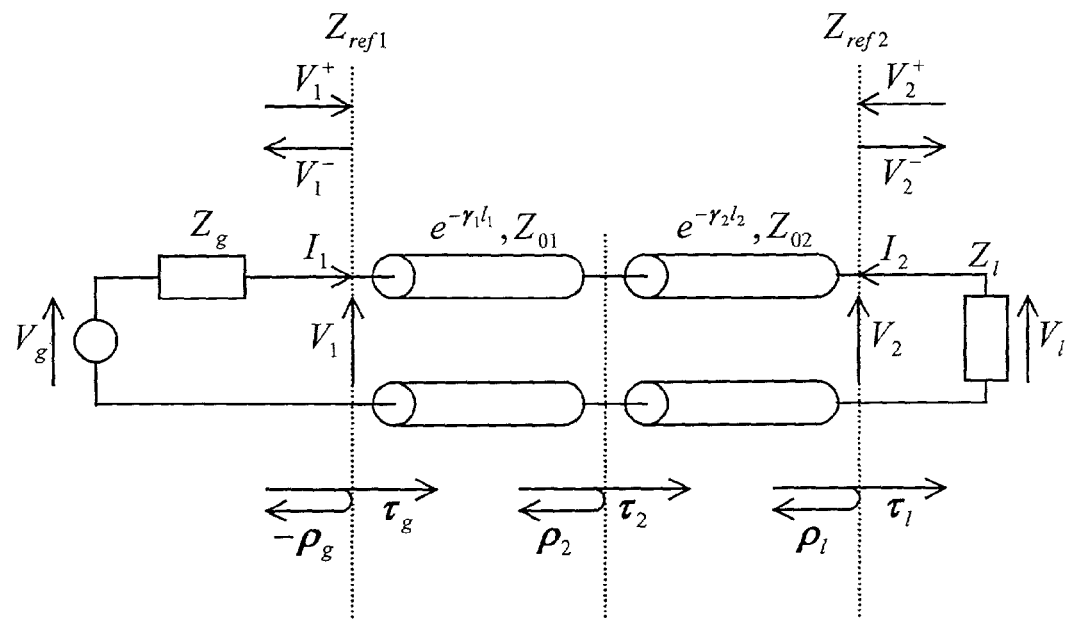
FIG. 3 transmission line model of a loop of two cascaded lines.

FIG. 3 depicts an equivalent electrical circuit of an access network consisting of a cascade of two lines. Initial values often parameters $a_{11}$ $a_{21}$ $a_{31}$ $a_{41}$ $a_{51}$ $a_{12}$ $a_{22}$ $a_{32}$ $a_{42}$ $a_{52}$ of the parametric model need to be determined and then optimized. The aim of the modeling exercise is to obtain an expression for $S_{11}$, the scattering function and H, the transfer function.

$Z_f = \infty$, $\rho_f = 1$, (assumption open-circuit at the end)

$$S_{11} = \frac{-\rho_g + \rho_2 e^{-2\gamma_1 l_1} - \rho_g \rho_2 e^{-2\gamma_2 l_2} + e^{-2(\gamma_1 l_1 + \gamma_2 l_2)}}{1 - \rho_g \rho_2 e^{-2\gamma_1 l_1} + \rho_2 e^{-2\gamma_2 l_2} - \rho_g e^{-2(\gamma_1 l_1 + \gamma_2 l_2)}} \quad (24)$$

$Z_g = 0$, $\rho_g = -1$, $\tau_g = 2$ $$H = \frac{\tau_2 \tau_1 e^{-(\gamma_1 l_1 + \gamma_2 l_2)}}{1 + \rho_2 e^{-2\gamma_1 l_1} + \rho_2 \rho_l e^{-2\gamma_2 l_2} + \rho_l e^{-2(\gamma_1 l_1 + \gamma_2 l_2)}} \quad (25)$$

II. Estimators

A. Cost Function

In the following one cost function will be described for use in optimizing the parameters of the parametric model, but the present invention is not limited thereto. It is called maximum likelihood for the output error model. This type of cost function has useful properties such as the fact that estimated parameters are not biased, $$V(\theta_1, \ldots, \theta_N) = \sum_{k=1}^{M} \frac{|S_{11}^{model}(f_k, \theta_1, \ldots, \theta_N) - S_{11,k}^{measurement}|^2}{\sigma_{S_{11},k}^2} \quad (26)$$

M=number of frequency samples
N=number of parameters

This first cost function in $S_{11}$ is important for the general method in accordance with the present invention. The following second cost function in H is only used for validation purposes.

$$V(\theta_1, \ldots, \theta_N) = \sum_{k=1}^{N} \frac{|H^{model}(f_k, \theta_1, \ldots, \theta_N) - H_k^{measurement}|^2}{\sigma_{H,k}^2} \quad (27)$$

B. Minimizer

The optimization of parameters is carried out by minimizing a difference represented by the cost function. The preferred minimizer is from Levenbergh-Marquardt but the present invention is not limited to this type of optimization algorithm, nor to any particular values for the starting values.

As an example, the following starting values may be selected:

$a$=0.25×10$^{-3}$ mm $D$=1×10$^{-3}$ mm $\sigma$=5.8×10$^7$ S/m assumed for copper conductors.

$\mu$=$\mu_0$ for PE insulated cables $\epsilon$=2.26$\epsilon_0$ for PE insulated cables Lext=mu/(2*pi)*log($D$^2/radius^b 2);

$C$=1/Lext*epsilon*mu;

The minimum of the cost function as a function of the model parameters may be found by means of an iterative optimization algorithm. There is a large variety of optimization routines available which are known to the skilled person. The Levenberg-Marquardt (LM) method is one of the preferred ones. It combines the Gauss-Newton and gradient descent procedures. The Gauss-Newton method is fast, because it makes use of second-order derivatives, but it does not always converge. This problem of convergence is solved in the Levenberg-Marquardt algorithm by addition of the gradient descent method. The Levenberg-Marquardt algorithm only searches for a local minimum. In order to find the global minimum, the initial values of the model parameters have to be close enough to the exact values, which correspond to the global minimum of the cost function. In accordance with an aspect of the present invention achieving the absolute minimum of the cost function is assisted by selecting a parametric model which is at least quasi-realistic so that reliable initial values for at least some of the coefficients can be estimated. Preferably, the parametric model should be chosen such that a majority of the coefficients (more than 50%, more preferably 60% or more and most preferably 70% or more) can be estimated based on physical characteristics of the network to be qualified.

III. Measurements

A. Measurement Setup

These are the settings used for the network analyzer measurements for determining $S_{11}$ (for the estimation) and H (for the validation).

In the measurement step the reflectogram of the network is measured for a specific excitation signal. A Hewlett Packard Network Analyzer type HP4195A was used with a start frequency of 3*4.3125=12.9375 kHz (tone 3) and a stop frequency of 1.104000 MHz (tone 256). The RBW was 100 Hz, sweep time 2 min, and 401 points were recorded. Four measurements were performed of $S_{11}$ and H in each case to be able compute mean and variance values. These latter values are used as weighting factors in the MLE cost function (see equation 26)

The transmission lines used were cables, e.g. as supplied by Belgacom (Belgium), having a conductor diameter of 0.5 mm, a PE insulation, and 20 pairs in the form of quads; as supplied by BT (UK), having a conductor size of 0.5 mm, insulation of PE, 20 pairs; as supplied by FT (France), having conductor size of 0.4 mm, PE insulation, 8 pairs, quads. the North Hill balance was 50 Ohm to 135 Ohm B. Results Only the magnitude is shown, although the phase has been estimated as well. The magnitude is however most important for the capacity estimation The results are shown for 3 topologies, but the patent is not limited to these 3 topologies.

Figure 4:
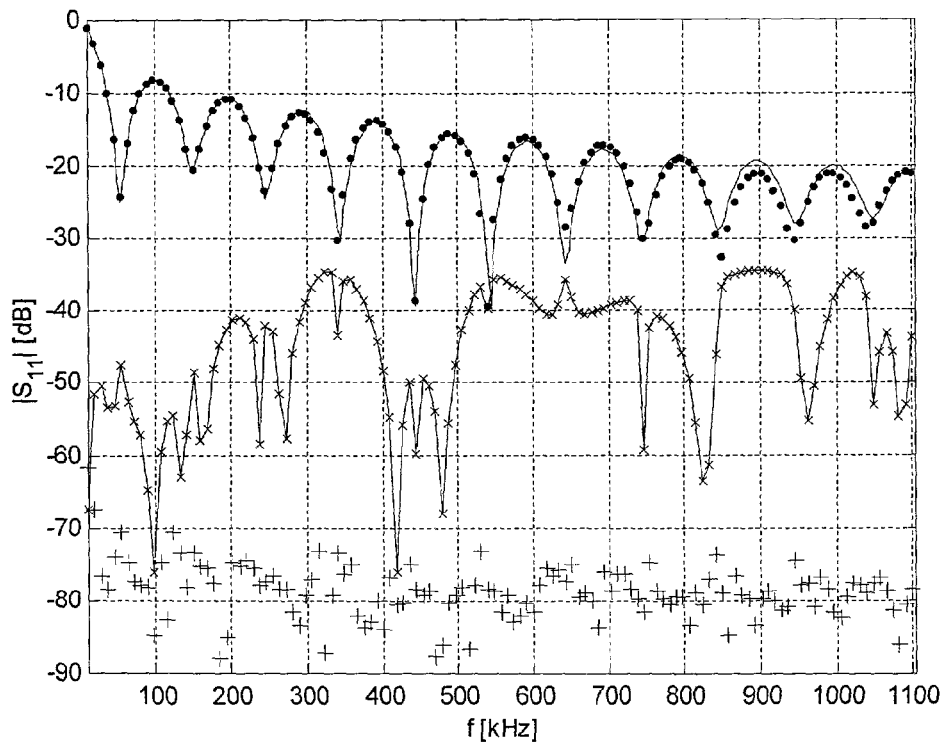
FIG. 4 Measurements and estimated values of the scattering parameter $S_{11}$ versus frequency using embodiments of the present invention for a single line.
Figure 6:
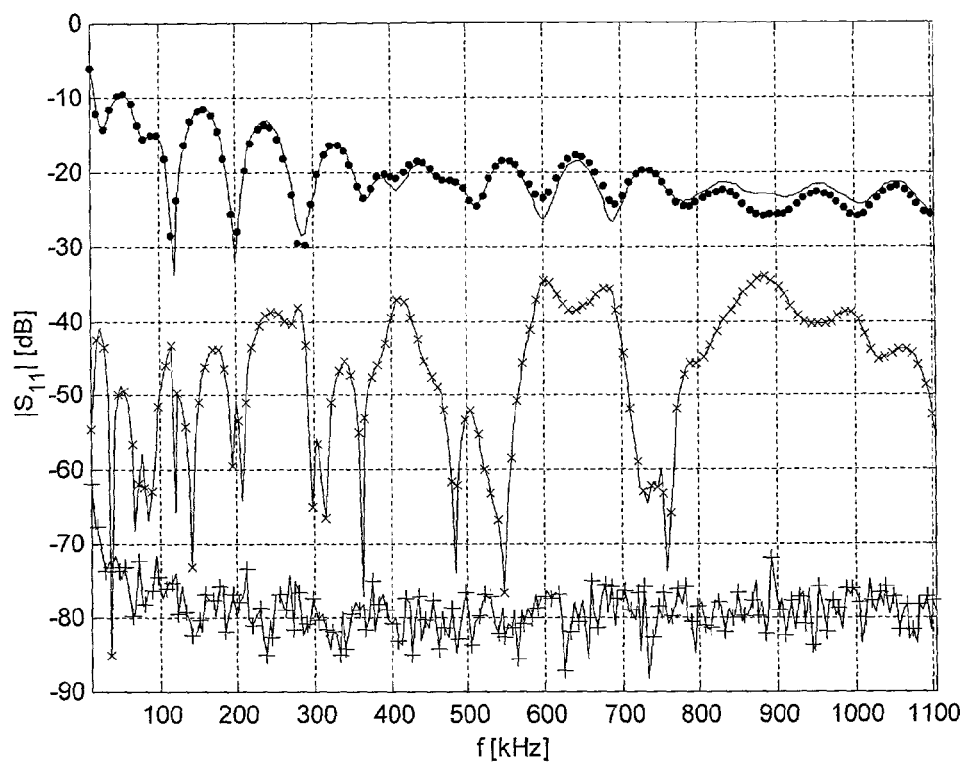
FIG. 6 Measurements and estimated values of the scattering parameter $S_{11}$ versus frequency using embodiments of the present invention for two cascaded lines.
Figure 8:
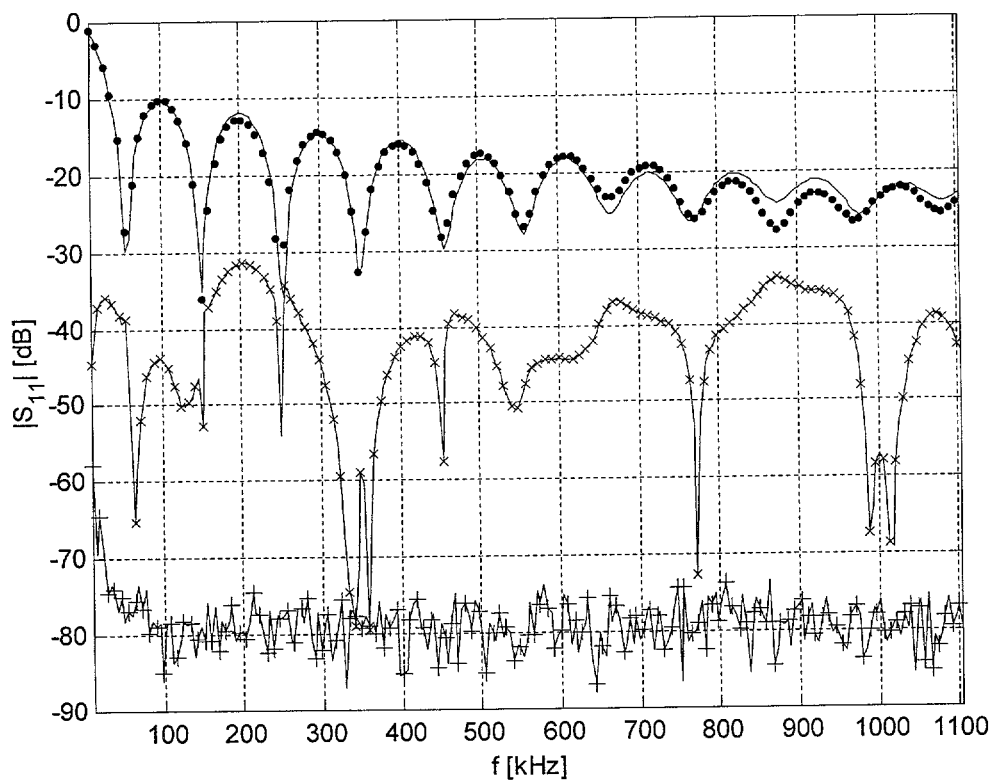
FIG. 8 Measurements and estimated values of the scattering parameter $S_{11}$ versus frequency using embodiments of the present invention for a bridge tapped line.

LEGEND for graphs in FIGS. 4, 6, 8 showing $S_{11}$ on the y axis is:

.(dotted): measured values as shown in upper portion of figures

-(full line): estimation as shown in upper portion of figures

-x-(full line, x): error as shown in the middle of the figures

-+-(full line for FIGS. 6 and 8 only, +): 95% confidence bound as shown in lower portion of the figures Remark: in the case that there are only stochastic errors present, the error should be below the 95% confidence bound. Where this not the case this means that there are model errors present.

Figure 5:
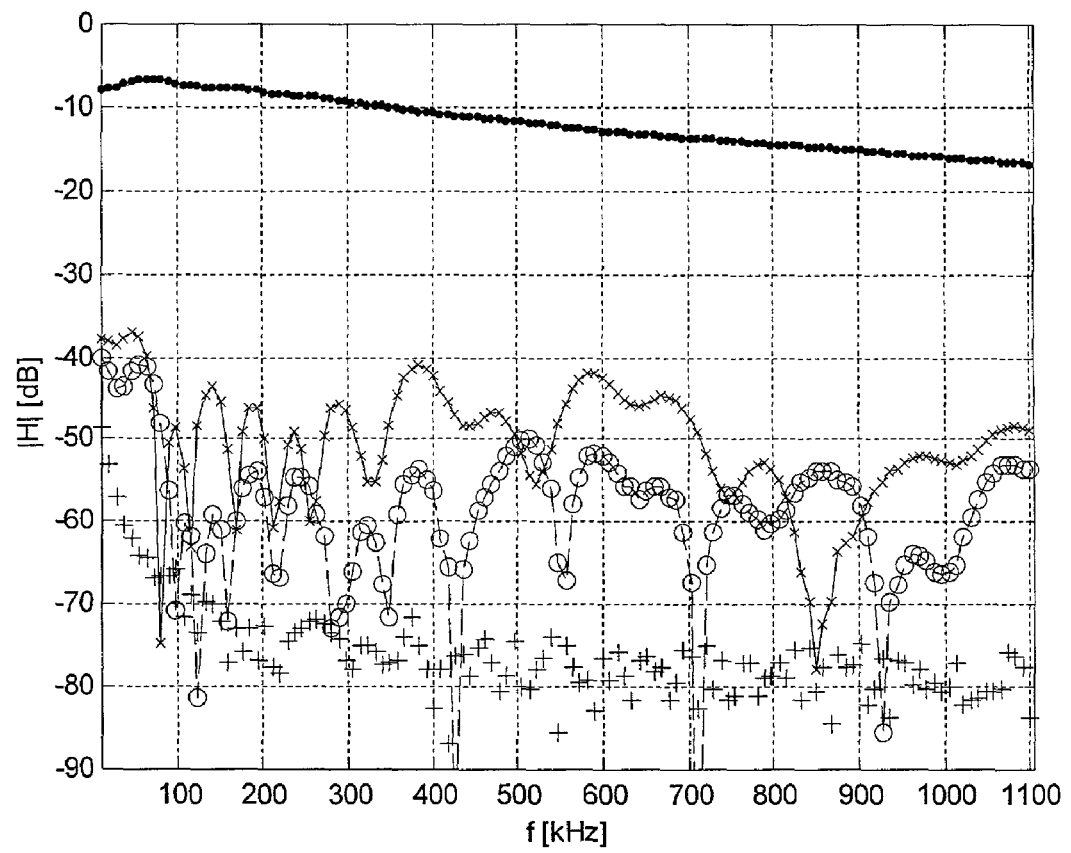
FIG. 5 measurements and estimated values of the transfer function H versus frequency using embodiments of the present invention for a single line.

LEGEND for graphs in FIG. 5, 7, 9 having H as the y axis is:

.(dotted): measured values as shown in upper portion of figures

-(full line): estimation via $S_{11}$ (generally so close to the dots that it cannot be distinguished from these at this scale)

--(dashed line in FIGS. 7 and 9): estimation via H (generally so close to the dots that it cannot be distinguished from these at this scale)

-x-(full line, x): error in the estimation via $S_{11}$ in the middle of the figures -o-(dashed line in FIG. 5, full line in FIGS. 7 and 9, o): error in the estimation via H in the middle of the figures -+-(full line only in FIGS. 7 and 9, +): 95% confidence bound in the lower portion of the figures 1) Single Line In FIG. 4 the results for the scattering factor $S_{11}$, both model and measurement and in FIG. 5 for the transfer function H for a single line, both measurement and model are shown.

2) Loop With a Bridged Tap

Figure 7:
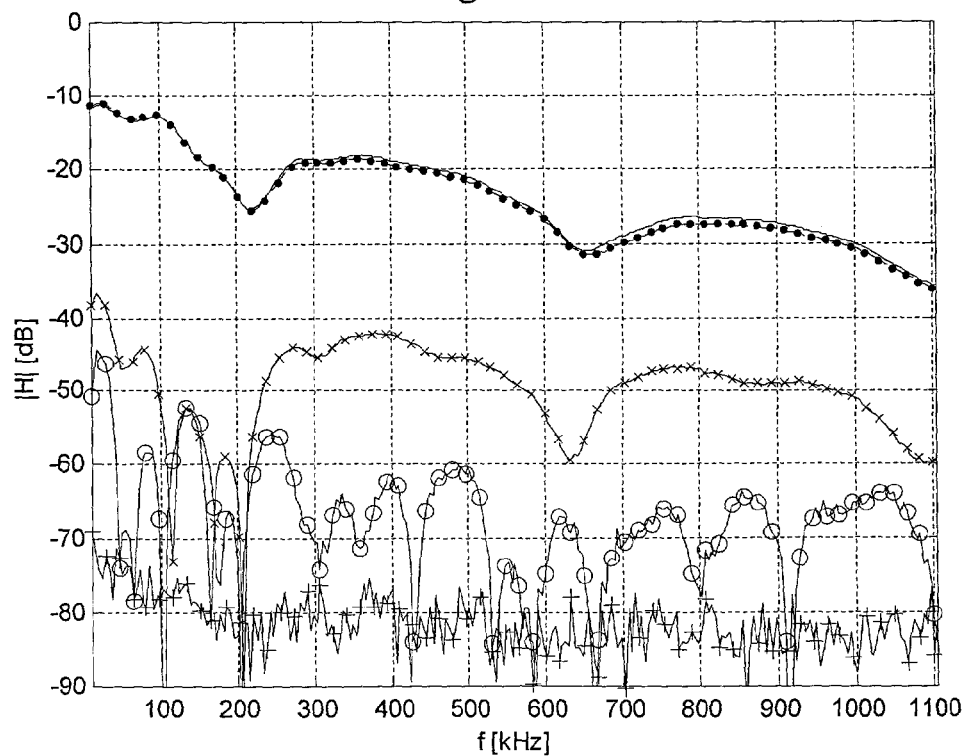
FIG. 7 measurements and estimated values of the transfer function H versus frequency using embodiments of the present invention for two cascaded lines.

In FIG. 6 the results for the scattering factor $S_{11}$, both model and measurement and in FIG. 7 for the transfer function H, both measurement and model are shown.

All segments of cable were BT cable with conductor size of 0.5 mm, first segment was 900 m, second segment 700 m and bridged tap 200 m.

3) Cascade of 2 Lines

Figure 9:
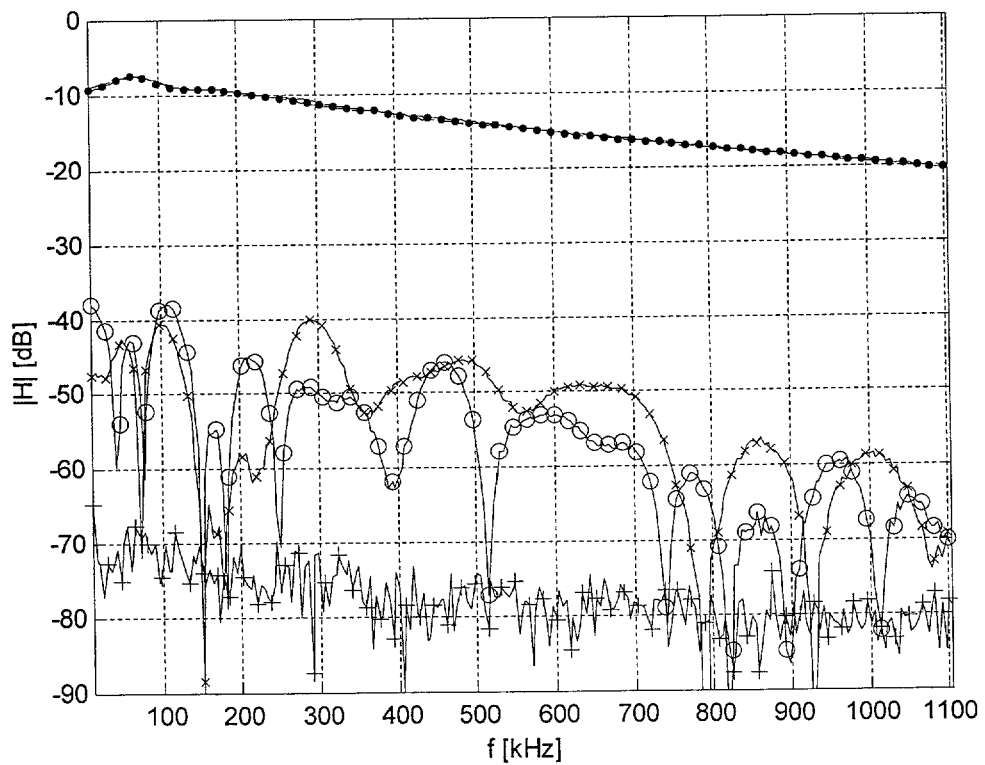
FIG. 9 measurements and estimated values of the transfer function H versus frequency using embodiments of the present invention for a bridge tapped line.

In FIG. 8 the results for the scattering factor $S_{11}$, both model and measurement and in FIG. 9 for the transfer function H, both measurement and model are shown.

A BT cable of 500 m and conductor size 0.5 mm was cascaded with an FT cable of 400 m with a conductor size of 0.4 mm.

For all the 3 topologies it is clear that the 3 transfer functions (measured, estimated via 1-port measurement $S_{11}$, estimated via a 2-port measurement H) match very well.

IV Capacity Estimation

The capacity estimation is done using the formula based on Shannon's theory given as equation 1 above and the estimated transfer function H. The noise PSD needs to be determined, e.g. by measurement. At one end of the transmission line, e.g. at the CO for an access network, the noise PSD (for the upstream capacity) can be measured. At the other end of the line, e.g. the customer premises in an access network, the noise PSD can be estimated for example by use of a model for the noise PSD at this end (for the downstream capacity).

V Implementation

The present invention may be implemented on a computing device e.g. a personal computer or a work station which has an input device for loading the details of the network whose capacity is to be estimated, e.g. its topology as well as any other parameters required by the various models and methods defined above in the description as well as in the attached claims. The computing device may be in the form of a card mounted microprocessor which may plugged into a network card slot of a telecommunications network element such as the 7300 Alcatel DSL Subscriber Access Multiplexer supplied by Alcatel NV, Antwerp Belgium. It could also be integrated in a handheld testing device used by a technician in the field or by testing equipment next to the Subscriber Access Multiplexer. The computing device is adapted to run software which carries out any of the methods in accordance with the present invention. The computer may alternatively be a server which is connected to a data communications transmission means such as the Internet, a Local Area Network or a Wide Area Network. A script file including, for example, the details of the topology of the network and/or physical constants relating to the materials used in the construction of the transmission line(s), may be sent from one near location, e.g. terminal, to a remote, i.e. second location, at which the server resides. In addition details of the reflectogram for the relevant network may be sent to the server from the same near location or from another location. The server receives all this data and carries out a method in accordance with the present invention and outputs back along the communications line useful data to a near terminal, e.g. one or more optimized coefficients of a transmission line model, a transfer function of the network, a capacity figure, or a yes no answer as to whether the capacity of the network is greater or less than a predetermined target figure.

Figure 10:
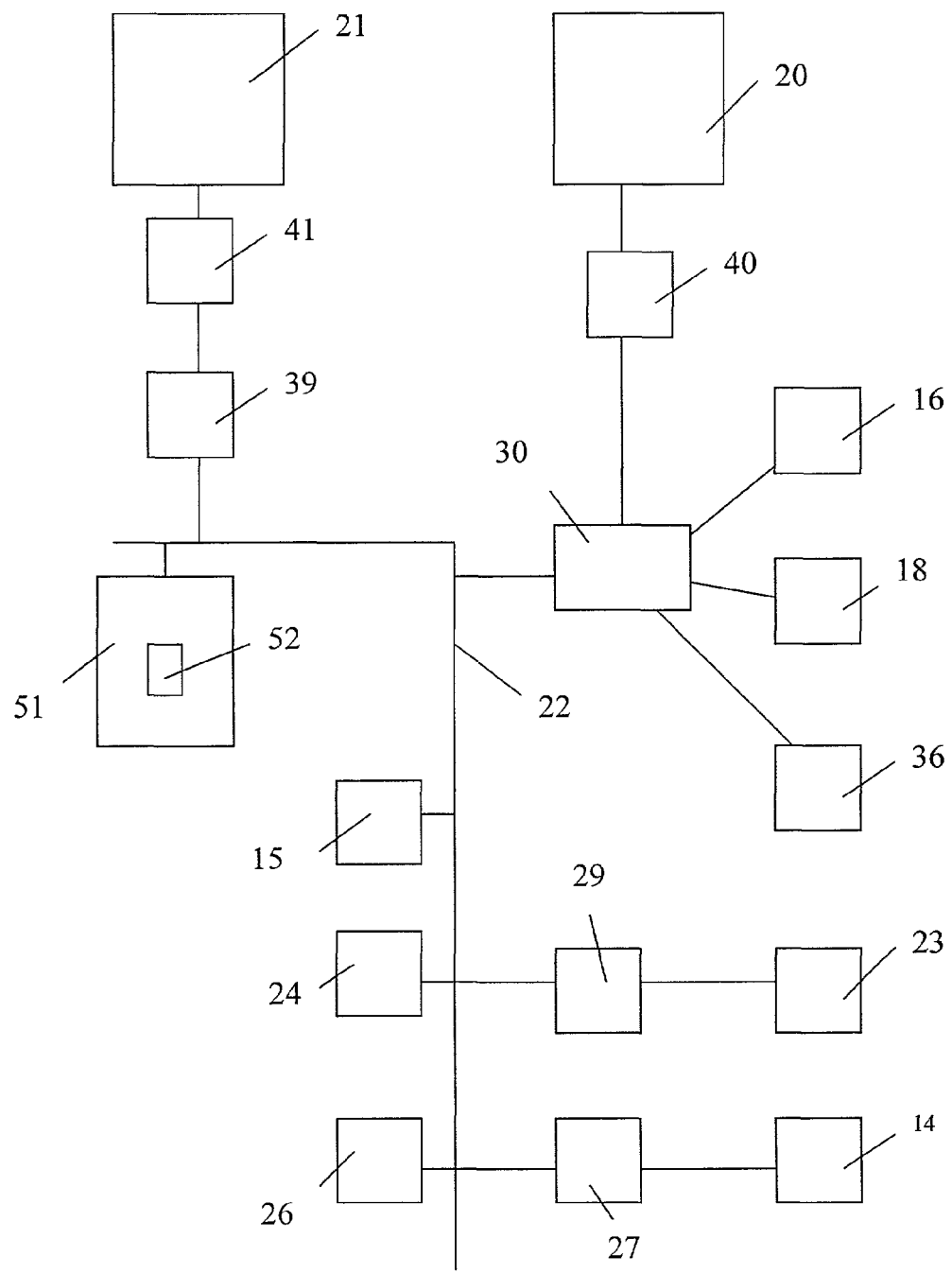
FIG. 10 is a schematic representation of a computing device which can be used with the present invention.

FIG. 10 is a schematic representation of a computing system which can be utilized in accordance with the methods and systems of the present invention. A computer 10 is depicted which may include a video display terminal 14, a data input means such as a keyboard 16, and a graphic user interface indicating means or pointer such as a mouse 18. Computer 10 may be implemented as a general purpose computer.

Computer 10 includes a Central Processing Unit ("CPU") 15, such as a conventional microprocessor of which a Pentium III processor supplied by Intel Corp. USA is only an example, and a number of other units interconnected via system bus 22. The computer 10 includes at least one memory. Memory may include any of a variety of data storage devices known to the skilled person such as random-access memory ("RAM"), read-only memory ("ROM"), non-volatile read/write memory such as a hard disc as known to the skilled person. For example, computer 10 may further include random-access memory ("RAM") 24, read-only memory ("ROM") 26, as well as an optional display adapter 27 for connecting system bus 22 to an optional video display terminal 14, and an optional input/output (I/O) adapter 29 for connecting peripheral devices (e.g., disk and tape drives 23 such as for example a CD-ROM reader) to system bus 22. Video display terminal 14 can be the visual output of computer 10, which can be any suitable display device such as a CRT-based video display well-known in the art of computer hardware. However, with a portable or notebook-based computer, video display terminal 14 can be replaced with a LCD-based or a gas plasma-based flat-panel display. Computer 10 further includes user interface adapter 30 for connecting a keyboard 16, mouse 18, optional speaker 36, as well as allowing optional physical value inputs from physical value capture devices 40 of an external system 20. The devices 40 may be any suitable equipment for capturing physical parameters of the network or parameters of the various models required in the execution of the present invention. These capture devices may also include a stimulus and a measurement device for inputting a test wave and for measuring the response of a network or parts thereof, e.g. a reflectogram. Additional or alternative devices 41 for capturing physical parameters of an additional or alternative external system 21 may also connected to bus 22 via a communication adapter 39 connecting computer 10 to a data network such as the Internet, an Intranet a Local or Wide Area network (LAN or WAN) or a CAN. The term "physical value capture device" can also includes devices which provide values of parameters of a network or networks, e.g. topologies, or for instance a library of candidate networks or candidate network topologies.

Computer 10 also includes a graphical user interface that resides within a machine-readable media to direct the operation of computer 10. Any suitable machine-readable media may retain the graphical user interface, such as a random access memory (RAM) 24, a read-only memory (ROM) 26, a magnetic diskette, magnetic tape, or optical disk (the last three being located in disk and tape drives 23). Any suitable operating system and associated graphical user interface (e.g. Microsoft Windows) may direct CPU 15. In addition, computer 10 includes a control program 51 which resides within computer memory storage 52. Control program 51 contains instructions that when executed on CPU 15 carries out the operations described with respect to the methods of the present invention. The instructions may be obtained by writing a computer program in a suitable language such as C or C++ for execution of any of the methods in accordance with the present invention and then compiling the program so that it executes on a computing device.

Those skilled in the art will appreciate that the hardware represented in FIG. 10 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already described.

In the example depicted in FIG. 10, a computer program product (i.e. control program 51 for executing methods in accordance with the present invention comprising instruction means in accordance with the present invention) can reside in computer storage 52. The instructions (e.g., computer readable code segments in storage 52) may be read from storage into RAM 24. Execution of sequences of instructions contained in the RAM 24 causes CPU 15 to perform the process steps described herein. In alternative embodiments, hard-wired circuitry may be used in place of or in combination with software instructions to implement the invention. Thus, embodiments of the invention are not limited to any specific combination of hardware circuitry and software. Accordingly, the present invention may take the form of an entirely hardware embodiment, an entirely software embodiment or an embodiment combining software and hardware aspects.

Furthermore, the present invention may take the form of a data carrier medium (e.g. a computer program product on a computer-readable storage medium) carrying computer-readable program code segments embodied in the medium. The terms "carrier medium" and "computer-readable medium" as used herein refer to any medium that participates in providing instructions to a processor such as CPU 15 for execution. Such a medium may take many forms, including but not limited to, non-volatile media, volatile media, and transmission media. Non-volatile media include, for example, optical or magnetic disks, such as a CD-ROM or a storage device which is part of mass storage. Volatile media includes dynamic memory such as RAM 24. Transmission media include coaxial cables, copper wire and fiber optics, including the wires that comprise a bus within a computer, such as bus 22. Transmission media can also take the form of acoustic or light waves, such as those generated during radio wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

These various forms of computer readable media may be involved in carrying one or more sequences of one or more instructions to processor 15 for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet. However, it is important that those skilled in the art will appreciate that the methods of the present invention are capable of being distributed as a program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links which may be used for downloading the computer program product.

VI Method

A method in accordance with the present invention will be described with reference to a personal computer. A computer program written to carry out the methods of the present invention is started in the usual way. For instance, a pop-up message appears providing an input form for specifying the network topology to be used. Alternatively or additionally the possibility for using predefined topologies may be provided, e.g. by allowing selection from a drop-down menu. Alternatively or additionally an option may be provided when the topology is not known. In this case the program will make use of a set of predefined typical topologies and will attempt to fit a measured reflectogram to each of the models. The best fit is assumed to represent a topology which is close to the actual topology and is used for the capacity estimation.

After having entered the necessary data, for example network topology, insulating and conductor materials of a twisted pair cable, conductor spacing of the cable, etc. the reflectogram for the network may be entered. This may be done by loading from a peripheral device, e.g. from a CD-ROM read by a CD-ROM reader, or by downloading it from mass storage, e.g. from a server located on a LAN or via the Internet. Alternatively, the computer may be connected to a suitable reflectogram capture device, e.g. via a USB interface, for direct measurement and loading of the reflectogram. The reflectogram may be obtained from a single location in the network, e.g. from the connection point of a local loop to a central office. The reflectogram will generally be in analogue form and is converted into digital signals by an analogue/digital converter. The program then optimizes the coefficients of the parametric model, e.g. by minimizing a cost function relating to a difference between the measured reflectogram and a computed transfer function for the model. Using the optimized parametric model a transfer function of the network is determined. From this transfer function a capacity for the network can be estimated.

The output of the computer program can be any or all of the following:
- a set of optimized parameters and/or a network topology which provides the best fit
- a transfer function of the network
- an estimated reflectogram based on the optimized parametric model
- a comparison between the optimized reflectogram and the measured reflectogram
- an estimated capacity for the network
- a yes/no answer or a probability that the network will support a capacity above or below a certain target capacity
- a message that the reflectogram cannot be modeled with a reasonable accuracy (due to unusual topology, unusual materials)
- a length of the network which can support a certain capacity or a variety of lengths for a variety of capacities.

List of Symbols
C=channel capacity
P=received power spectral density
S=transmitted power spectral density OR scattering matrix
N=noise power spectral density
H=transfer function
$\gamma$=propagation constant
$Z_0$=characteristic impedance
l=length
$\sigma$=electrical conductivity OR standard deviation
$\mu$=magnetic permeability
$\in$=electrical permittivity
D=distance between conductor centers
a=radius conductors
$a_1$=physical model parameter
s=Laplace frequency
$\omega$=angular frequency
$z_s$=per-unit-length serial impedance
$y_p$=per-unit-length parallel admittance
$\psi$=auxiliary function
$J_l$=Bessel function
$V_l$=voltage
$I_l$=current
$V_l^\pm$=forward (+) and backward (−) travelling voltage wave
$Z_{refl}$=reference impedance
$\rho$=reflection coefficient
$\tau$=transmission coefficient
$S_{ij}$=scattering parameters
T=transmission (ABCD) matrix
A, B, C, D=elements of ABCD matrix
$Z_{in}$=input impedance

The invention claimed is:

1. A method of modeling a network, comprising the steps of:
carrying out a 1 port measurement on the network by inputting an excitation signal at one port of the network and recording the results at the port;
generating a 1 port parametric model of the network;
optimizing the values of the parameters of the 1 port parametric model by reducing the difference between the results of the measurement step and results calculated using the 1-port parametric model and the excitation signal; and
generating a 2-port parametric model using the optimized parameter values of the 1 port parametric model to provide a 2-port model of the network.

2. The method according to claim 1, wherein the reducing step is carried out by minimizing a cost function by adapting the values of the parameters of the 1 port parametric model, the cost function representing a quantification of the difference.

3. The method according to claim 1, further comprising a step of limiting the 2-port model to a transfer function.

4. The method according to claim 3 further comprising the steps of:
measuring a first noise PSD at one port of the network and estimating or measuring a second PSD at the other port; and
using the transfer function and the first and second noise PSD to estimate the capacity of the network.

5. A system for modeling a network, comprising:
means for carrying out a 1 port measurement on the network by inputting an excitation signal at one port of the network and recording the results at the port;
means for generating a 1 port parametric model of the network;
means for optimizing the values of the parameters of the 1 port parametric model by reducing the difference between the results of the measurement step and results calculated using the 1-port parametric model and the excitation signal; and
means for generating a 2-port parametric model using the optimized parameter values of the 1 port parametric model to provide a 2-port model of the network.

6. The system according to claim 5, wherein the means for reducing comprises means for minimizing a cost function by adapting the values of the parameters of the 1 port parametric model, the cost function representing a quantification of the difference.

7. The system according to claim 5, further comprising: means for limiting the 2-port model to the transfer function.

8. The system according to claim 7 further comprising:
means for measuring a first noise PSD at one port of the network and estimating or measuring a second PSD at the other port; and
means for using the transfer function and the first and second noise PSD to estimate the capacity of the network.

9. A data carrier medium carrying one or more computer readable code segments for controlling a processing device to carry out the method in accordance with claim 1.

10. A computer program product for execution of the method in accordance with claim 1 on a computer system.

11. A method for modeling a representation of network, said method comprising:
transmitting a description of the network from a near location to a remote computing system via a telecommunications network;
executing on the remote computer system the method of claim 1; and
transmitting to a near location information relating to the response of the network to an excitation signal.

\* \* \* \* \*